United States Patent [19]
>
> Hans et al.

[11] Patent Number: 5,072,885
[45] Date of Patent: Dec. 17, 1991

[54] VALVE NEEDLE AND METHOD FOR PRODUCING A VALVE NEEDLE

[75] Inventors: Waldemar Hans, Bamberg; Guenther Bensch, Stein, both of Fed. Rep. of Germany

[73] Assignee: Robert Bosch GmbH, Stuttgart, Fed. Rep. of Germany

[21] Appl. No.: 508,631

[22] Filed: Apr. 13, 1990

[30] Foreign Application Priority Data

May 2, 1989 [DE] Fed. Rep. of Germany ....... 3914486

[51] Int. Cl.⁵ .................. B05B 1/34; F02M 61/00
[52] U.S. Cl. .................. 239/466; 239/533.3; 239/533.12; 239/585; 29/888.41
[58] Field of Search .......... 239/464, 466, 533.2, 239/533.3, 533.9, 533.11, 533.12, 585; 29/888.4, 888.41

[56] References Cited

U.S. PATENT DOCUMENTS

| 1,693,931 | 12/1928 | Lowe | 239/533.12 X |
| 1,814,443 | 7/1937 | Goldberg . | |
| 2,096,581 | 10/1937 | Goldberg . | |
| 4,295,453 | 10/1981 | Seilly et al. | 239/585 X |
| 4,408,722 | 10/1983 | Frelund | 239/533.12 X |
| 4,575,008 | 3/1986 | Kaczynski | 239/533.11 X |
| 4,605,171 | 8/1986 | Trachte et al. | 239/533.3 X |
| 4,634,055 | 1/1987 | Hans et al. | 239/533.12 X |
| 4,651,931 | 3/1987 | Hans et al. . | |
| 4,718,635 | 1/1988 | de Concini et al. | 239/585 X |
| 4,903,898 | 2/1990 | Kind | 239/533.12 |
| 4,925,111 | 5/1990 | Foertsch et al. | 239/533.12 |
| 4,974,565 | 12/1990 | Hashimoto et al. | 239/533.12 X |

Primary Examiner—Andres Kashnikow
Assistant Examiner—William Grant
Attorney, Agent, or Firm—Edwin E. Greigg; Ronald E. Greigg

[57] ABSTRACT

A fuel injection valve for an internal combustion engine, in which the valve needle blanks are cut from a profile bar having grooves in its circumference which extends the direction of the longitudinal axis; the blanks are then twisted to form helical grooves and then machined in a metal-cutting manner, in order to produce the final needle shape.

14 Claims, 1 Drawing Sheet

VALVE NEEDLE AND METHOD FOR PRODUCING A VALVE NEEDLE

BACKGROUND OF THE INVENTION

The invention relates to a method for producing a valve needle and to a valve needle, particularly for fuel injection valves of internal combustion engines.

Valve needles are already known (U.S. Pat. Nos. 1,814,443 and 2,096,581) that have helical grooves that must be made by complicated, expensive machining. It is also known (U.S. Pat. No. 4,651,931) to operate fuel injection valves or fuel injection systems in internal combustion engines electromagnetically, and for that purpose to provide the valve needle with an armature.

OBJECT AND SUMMARY OF THE INVENTION

The method as defined herein and the valve needle according to the invention have advantages over the prior art of simplifying the production of the valve needle, lowering the costs for production of the valve needle and improving the quality of the resultant valve needle.

The grooves of the needle carry a fluid medium through the valve, and an oblique position of the grooves leads to an improvement in fuel preparation.

A particularly advantageous feature of the invention is the course of the grooves over the guide sections, stop plate and armature head, by way of which the fuel can flow without further machining.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
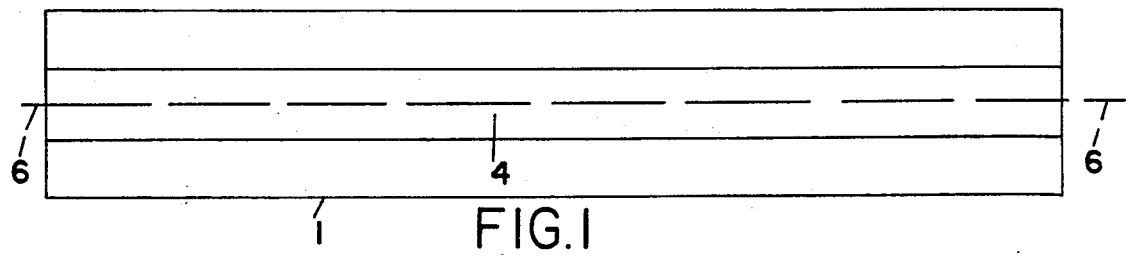
FIG. 1 illustrates a piece of cut bar with grooves therein.
Figure 3:
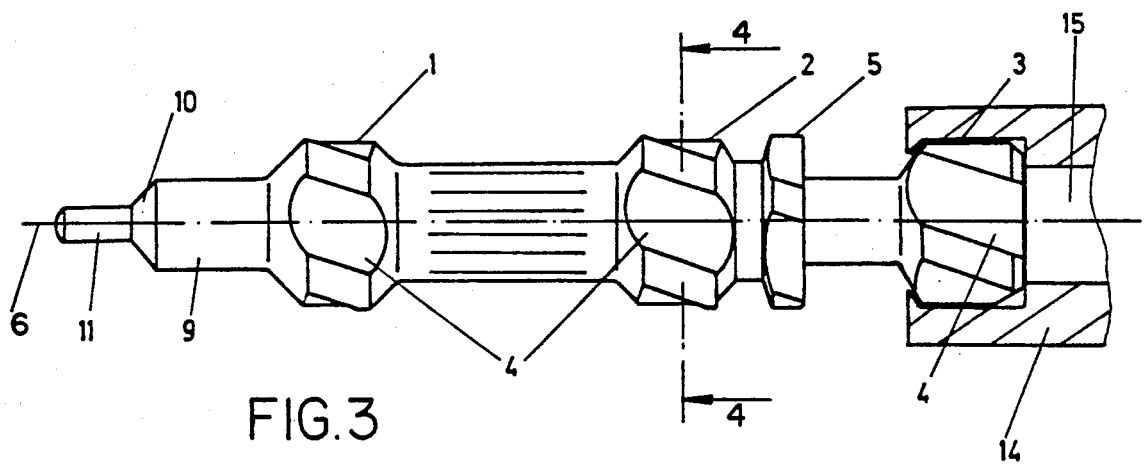
FIG. 3 is a view of a valve needle formed by a twisted-machined bar; according to the invention.
Figure 4:
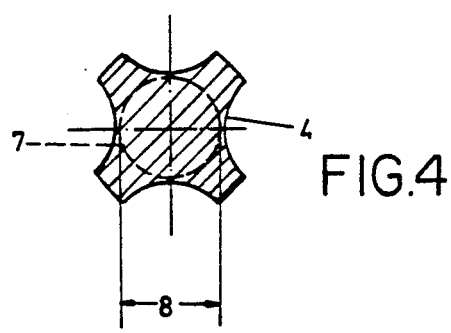
FIG. 4 is a section taken along the line 4—4 of FIG. 3.
Figure 2:
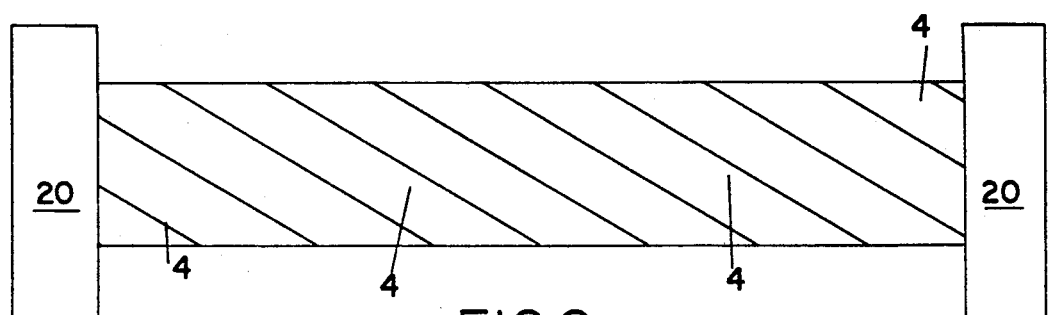
FIG. 2 illustrates a bar such as shown in FIG. 1 in a twisting machine after being twisted.

FIGS. 3 and 4 show a valve needle produced by the method according to the invention, as is used for instance in a fuel injection valve according to U.S. Pat. No. 4,651,931. By the method of the invention, a needle blank having an approximate length of a desired valve needle is cut from a commercially available profile bar, for instance of steel, that has axially aligned grooves extending in a direction of the longitudinal axis 6 as shown in FIG. 1. Next, the needle blank is twisted by any well known twisting machine 20 as represented in FIG. 2; which creates helical grooves 4 on its surface; a core 7 having a diameter 8 remains between the grooves 4. The needle blank is next machined by any well known machine in a metal-cutting manner, in such a way that as shown in the drawing, two guide sections 1 and 2 and one armature head 3, for example, are produced, spaced apart from one another. Between the guide section 2 and the armature head 3, a stop plate 5 is also created by metal-cutting machining. An electromagnet (not shown) can act upon the armature head 3 in order to lift the valve needle from a valve seat. To this end, an armature 14 is mounted on the armature head 3 and is joined to it. Valve closure is effected by a spring. The two guide sections 1 and 2 guide the valve needle in a bore of the valve housing, and the downstream guide section 1 is adjoined by a cylindrical section 9, which merges with a conical needle sealing face 10 that carries the actual sealing seat. Adjoining the sealing face 10 is a coaxial, cylindrical tang 11 of much smaller diameter that reinforces the atomization of the fuel. The fuel is guided by means of the grooves 4, beginning at a flow bore 15 in the armature 14 along the entire valve needle, and is also calmed during this guidance so that a good flow course is obtained. Because of the grooves 4 in the armature head 3, stop plate 5 and guide sections 1 and 2, an additional machining of these parts for flow guidance is not necessary and the grooves desirably lend a spin to the fuel, thus contributing to a very well prepared injected fuel stream.

The diameter 8 of the core 7 should be large enough that the largest diameter of the needle sealing face 10 can be machined out satisfactorily. That is, the depth of the grooves 4 must be kept such that the grooves 4 protrude only to near the core diameter 8.

As seen from the drawing, the machine portion between the two guide sections 1 and has a greater diameter than cylindrical section 9. The cylindrical section 9 is equal in diameter to the machined portion between the armature head 3 and the stop plate 5.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for producing a valve needle having helically disposed grooves, which comprises cutting a needle blank from a profile bar provided with axially aligned grooves extending in the direction of the longitudinal axis; twisting the needle blank to form helical grooves (4) along its length and then machining the twisted needle blank in a metal-cutting manner to form a final needle shape including at least one guide section (1, 2), a needle sealing face (10), and an armature head (3).

2. The method for producing a valve needle as set forth in claim 1, which includes machining said needle sealing face to have a conical section.

3. A method as set forth in claim 2, which includes machining said profile bar to form two spaced guide sections (1, 2) and a stop plate 5 between said armature head (3) and one of said guide sections.

4. A method as set forth in claim 3, which includes machining the spacing between said armature head and said stop plate to have the same diameter as a cylindrical end section (9) downstream of one of said guide sections.

5. A method as set forth in claim 4, which includes machining the spacing between said two guide sections (1 and 2) to have a diameter which is greater than said cylindrical end section (9) and the spacing between said armature head and said stop plate (5).

6. The method as defined by claim 1, which includes machining the grooves (4) in the profile bar to a depth such that the diameter of a core (7) of the valve needle is greater than or equal to the largest diameter of the needle sealing face (10).

7. The method as defined by claim 2, which includes machining the grooves (4) in the profile bar to a depth such that the diameter of a core (7) of the valve needle is greater than or equal to the largest diameter of the needle sealing face (10).

8. The method as defined by claim 3, which includes machining the grooves (4) in the profile bar to a depth such that the diameter of a core (7) of the valve needle is greater than or equal to the largest diameter of the needle sealing face (10).

9. The method as defined by claim 4, which includes machining the grooves (4) in the profile bar to a depth such that the diameter of a core (7) of the valve needle is greater than or equal to the largest diameter of the needle sealing face (10).

10. The method as defined by claim 5, which includes machining the grooves (4) in the profile bar to a depth such that the diameter of a core (7) of the valve needle is greater than or equal to the largest diameter of the needle sealing face (10).

11. A valve needle for fuel injection valves of internal combustion engines, which comprises at least one guide section, a needle sealing, a stop plate (5) and an armature head (3) each of said at least one guide sections, said stop plate and said armature head include aligned helical grooves (4) that extend on the circumference thereof.

12. A valve needle as set forth in claim 11, which includes two axially spaced guide sections.

13. The valve needle as defined by claim 11, in which said grooves (4) have a depth that at maximum extends as far as a core diameter (8) of the needle in which the core diameter is greater than or equal to the largest diameter of the needle sealing face (10).

14. The valve needle as defined by claim 12, in which said grooves (4) have a depth that at maximum extends as far as a core diameter (8) of the needle in which the core diameter is greater than or equal to the largest diameter of the needle sealing face (10).

* * * * *